United States Patent [19]

Ghanbari

[11] Patent Number: 5,418,571
[45] Date of Patent: May 23, 1995

[54] DECODING OF DOUBLE LAYER VIDEO SIGNALS WITH INTERPOLATION REPLACEMENT ON MISSING DATA FROM ENHANCEMENT LAYER

[75] Inventor: Mohammed Ghanbari, Essex, Great Britain

[73] Assignee: British Telecommunicatons public limited company, London, United Kingdom

[21] Appl. No.: 94,189

[22] PCT Filed: Jan. 31, 1992

[86] PCT No.: PCT/GB92/00182

§ 371 Date: Feb. 28, 1994

§ 102(e) Date: Feb. 28, 1994

[87] PCT Pub. No.: WO92/14339

PCT Pub. Date: Aug. 20, 1992

[30] Foreign Application Priority Data

Feb. 1, 1991 [GB] United Kingdom ................ 9102220

[51] Int. Cl.⁶ .......................... H04N 7/64; H04N 7/30
[52] U.S. Cl. ...................................... 348/416; 348/409
[58] Field of Search ............... 348/415, 416, 417, 402, 348/413, 409, 407

[56] References Cited

U.S. PATENT DOCUMENTS

| | | | |
|---|---|---|---|
| 4,302,775 | 11/1981 | Widergren et al. | 348/417 |
| 4,394,774 | 7/1983 | Widergren et al. | 348/417 |
| 4,723,161 | 2/1988 | Koga | 358/136 |
| 4,805,017 | 2/1989 | Kaneko et al. | 358/105 |
| 4,837,617 | 6/1989 | Brusewitz | 348/415 |
| 4,933,762 | 11/1988 | Guichard et al. | 348/416 |
| 4,958,226 | 9/1990 | Haskell | 358/136 |
| 5,043,808 | 8/1991 | Knauer et al. | 348/416 |
| 5,103,307 | 4/1992 | Sugiyama | 348/416 |
| 5,113,255 | 5/1992 | Nagata et al. | 348/416 |

FOREIGN PATENT DOCUMENTS 0397402 11/1990 European Pat. Off.

OTHER PUBLICATIONS

IEEE Journal on Selected Areas in Communication, vol. 7, No. 5, Jun. 1989, IEEE M. Wada "Selective Recovery of Video Packet Loss Using Error Concealment" pp. 807–814.

IEEE Journal on Selected Areas in Communication, vol. 7, No. 5 Jun. 1989, IEEE M. Ghanbari "Two Layer Coding of Video Signals for VBR Networks" pp. 771–781.

Proceedings of the International Switching Symposium, Stockholm, 28 May through 1 Jun. 1990, vol. 6 Voeten et al. "Integrating Video Codecs in ATM Networks", pp. 25–28.

IEEE M. Chanbari "Two Layer Coding of Video Signals for VBR Networks" pp. 771–781.

Proceedings of the International Switching Symposium, Stockholm, 28 May through 1 Jun. 1990, vol. 6. Voeten et al. "Integrating Video Codes in ATM Networks", pp. 25–28.

*Primary Examiner*—Tommy P. Chin
*Assistant Examiner*—Anand Rao
*Attorney, Agent, or Firm*—Nixon & Vanderhye

[57] ABSTRACT

A decoder for decoding coded video signals includes a base layer and an enhancement layer which includes a cell loss detector for detecting when cells are missing from the enhancement layer. In such an event the enhancement data from the immediately previous video signal displaced by a displacer according to the current motion vectors provides interpolation data for the missing cells. The interpolation data is added to the decoded base layer as indicated by an adder. The enhancement data is obtained by subtracting the immediately previous base video signal stored in a frame store from the immediately previous decoded video signal stored in another frame store as indicated by a subtracter.

6 Claims, 4 Drawing Sheets

Fig. 1. PRIOR ART CODER

DECODING OF DOUBLE LAYER VIDEO SIGNALS WITH INTERPOLATION REPLACEMENT ON MISSING DATA FROM ENHANCEMENT LAYER

BACKGROUND OF THE INVENTION

1. Field of the Invention

This invention relates to a method of and apparatus for decoding a currently received one of a series of two-layer coded video signals each of which includes a base layer of coded base data and coded motion vector data, and an enhancement layer of coded enhancement data being the differences between the uncoded video signal and a reconstruction of the immediately previous base video signal from the base layer.

2. Related Art

In this application the phrase video signals refers to a digital representation of a video source.

This so called two-layer coding of video signals was devised for use on ATM networks which may suffer cell loss causing large disruption in the transported data streams on variable bit rate (VBR) channels.

An example of a two-layer coding scheme is disclosed in U.S. Pat. No. 4,933,762 in which transmission is via a main path and an auxiliary path of a variable rate digital transmission network. When the main path is not capable of dispatching the totality of the picture information, auxiliary information is dispatched via the auxiliary path.

A drawback of conditional replenishment systems where only the significant differences between successive video signals (or frames) are coded and transmitted when more efficient interframe coders are used is that transmission errors are not confined to a single decoded frame but propagate into later frames.

Masahiro Wada in an article titled "Selective Recovery of Video Packet Loss Using Error Concealment", IEEE Journal on Selected Areas in Communications, Vol 7 (1989) Junek no 5, New York US describes an error concealment method for a single channel (i.e. one layer) transmission scheme over a VBR channel. When a decoder detects a video packet loss, picture quality is partially recovered by motion-compensated error concealment in which blocks from the previously received video frame are shifted by the average motion vectors of the blocks which neighbour those used for concealment. This method may prove adequate for one or two missing blocks but may cause a greater disturbance for a larger group of missing blocks. Experiments by the Applicant have shown that as many as four blocks can be fitted into a cell, or packet, and when cell loss occurs on an ATM network, it usually happens in bursts of cells, perhaps between three and ten, resulting in tens of missing blocks.

Preferably, the base layer carries data for a base mode picture together with vital information such as synchronisation data and should, therefore, be transmitted at a constant bit rate on a "guaranteed" constant bit rate channel.

The enhancement layer coding the differences between the video signal being coded and a video frame reconstructed from the base layer alone (which will also be referred to as "enhancement data"), brings the base mode picture up to the final required quality. The enhancement layer will, in general, have a fluctuating bit rate and can be transmitted via a VBR channel. Should any of this information be lost it will not affect tracking of the reconstructed frames but will only result in a momentary reversion to base mode quality. The occasional loss of resolution is compensated by obtaining the benefits of VBR transmission, for example, cost efficient use of the network channels.

Such coded video signals can be decoded by decoding the base layer to obtain a base video signal, decoding the enhancement layer to obtain enhancement data, and combining the base video signal and the enhancement data to obtain the final decoded video signal.

This two-layer coding scheme has been verified by computer simulation on a two-layer adaption of the CCITT H. 261 standard as reported in the IEEE Journal on Selected Areas in Communications, Vol 7 No. 5 June 1989 in an article by M. Ghanbari titled "Two-layer Coding of Video Signals for VBR Networks" in which the inclusion of motion compensation to code the video signal in the base layer leads to a high degree of bandwidth compression. The motion vectors are transmitted as part of the base layer in a "guaranteed" constant bit rate (CBR) channel as they are essential for reconstructing the base mode picture. As the enhancement layer mostly carries information about picture details or edges, the loss of data from this layer is seen as loss of resolution in the reconstructed picture generated from the decoded video signal. The base layer data will deliver an acceptable picture quality for plain areas but more detailed areas may suffer visible degradation, although computer simulations indicate this particular H. 261 based scheme is resilient to cell loss with rates as high as 1 in 10 not being readily visible.

SUMMARY OF THE INVENTION

The present invention aims to provide improved decoding of video signals encoded by such two-layer techniques and, according to a first aspect, a method of decoding such coded video signals is characterised in that it further includes the steps of detecting whether any enhancement data is missing from the enhancement layer; and, in such a case, interpolating the missing enhancement data from the enhancement data of the immediately previously received coded video signal and the motion vectors of the currently received base layer.

The invention utilises the fact that the base layer is transmitted via a "guaranteed" channel thereby ensuring receipt at the decoder of the motion vectors of the currently received, coded video signal. These motion vectors will therefore be available to provide the appropriate displacement to the immediately previous enhancement data to determine which of those enhancement data should be used to interpolate the enhancement data missing from the enhancement layer of current coded video signal. The method according to the present invention has the advantage that it provides a good quality reconstructed picture even with a large number of blocks missing in the enhancement layer caused by bursts of lost cells.

The interpolation of the enhancement data could be carried out in the transform domain on the previously received enhancement layer cells of information when linear transform coding (eg. DCT coding) is employed. However this will not, in general, be practicable as the enhancement coded parts of the frames vary spatially between frames and the cells do not carry data related to the same location but are packed into the available cell space. The interpolation is, then, preferably carried out in the picture element (pel) domain but it should be understood that the invention in its broadest aspect is not restricted to this preferred method.

The decoder for decoding the base layer may have a frame store for storing the immediately previous decoded base layer (the base video signal or base picture) to be used as a reference in decoding the following, current, video signal. A convenient method of obtaining the immediately previous enhancement data necessary for the present invention is to determine the differences between that stored base video signal and the immediately previous decoded video signal. This can be achieved by storing the immediately previous decoded video signal in a second frame store and subsequently obtaining the differences between these two video signals in known manner.

Alternatively, the immediately previous decoded enhancement data itself could be stored in a frame store so as to be available directly for decoding the current video signal by the method of the present invention.

The method adopted to detect whether any enhancement data is missing from the enhancement layer will depend in its details on the coding scheme used by the video signal coder. Usually, the enhancement layer will be transmitted in numbered cells so by inspecting the received cell sequence one can determine which, if any, may have been lost. When one or more cells are found to be missing, the data that may have been lost can be determined from the information of the intact cells bounding the missing cell or cells. This data is then interpolated using the motion vectors and the enhancement data from the immediately previous coded video signal.

According to a further aspect of the invention, a decoder for implementing the method according to the first aspect of the invention is characterised in including a cell-loss detection means for detecting whether any enhancement data is missing from the enhancement layer; interpolating means for providing interpolation data comprising the enhancement data of the immediately previous received, coded video signal modified in accordance with the motion vectors of the currently received base layer; and means for replacing any missing enhancement data with interpolated data.

The interpolating means may include a first frame store for storing a first base video signal which is a reconstruction from the base layer of the immediately previous coded video signal, a second frame store for storing the immediately previous decoded video signal, differencing means for obtaining the enhancement data by subtracting the first frame from the second frame, and displacement means for displacing the enhancement data in accordance with the received motion vectors.

Alternatively, the last decoded enhancement data may be stored in a frame store for layer use by the interpolating means.

When there is no cell loss the decoder functions as previously known two-layer decoders. In the event of possible lost cells, the interpolated data is used instead of the information in the missing cells to reconstruct the video signal thereby increasing the resolution of the picture generated by it in comparison to the prior art two-layer decoders.

BRIEF DESCRIPTION OF THE DRAWINGS

A preferred embodiment of the invention will now be described, by way of example only, and its principle of operation explained in more detail with reference to the accompanying drawings of which.

DETAILED DESCRIPTION OF EXEMPLARY EMBODIMENTS

Figure 1:
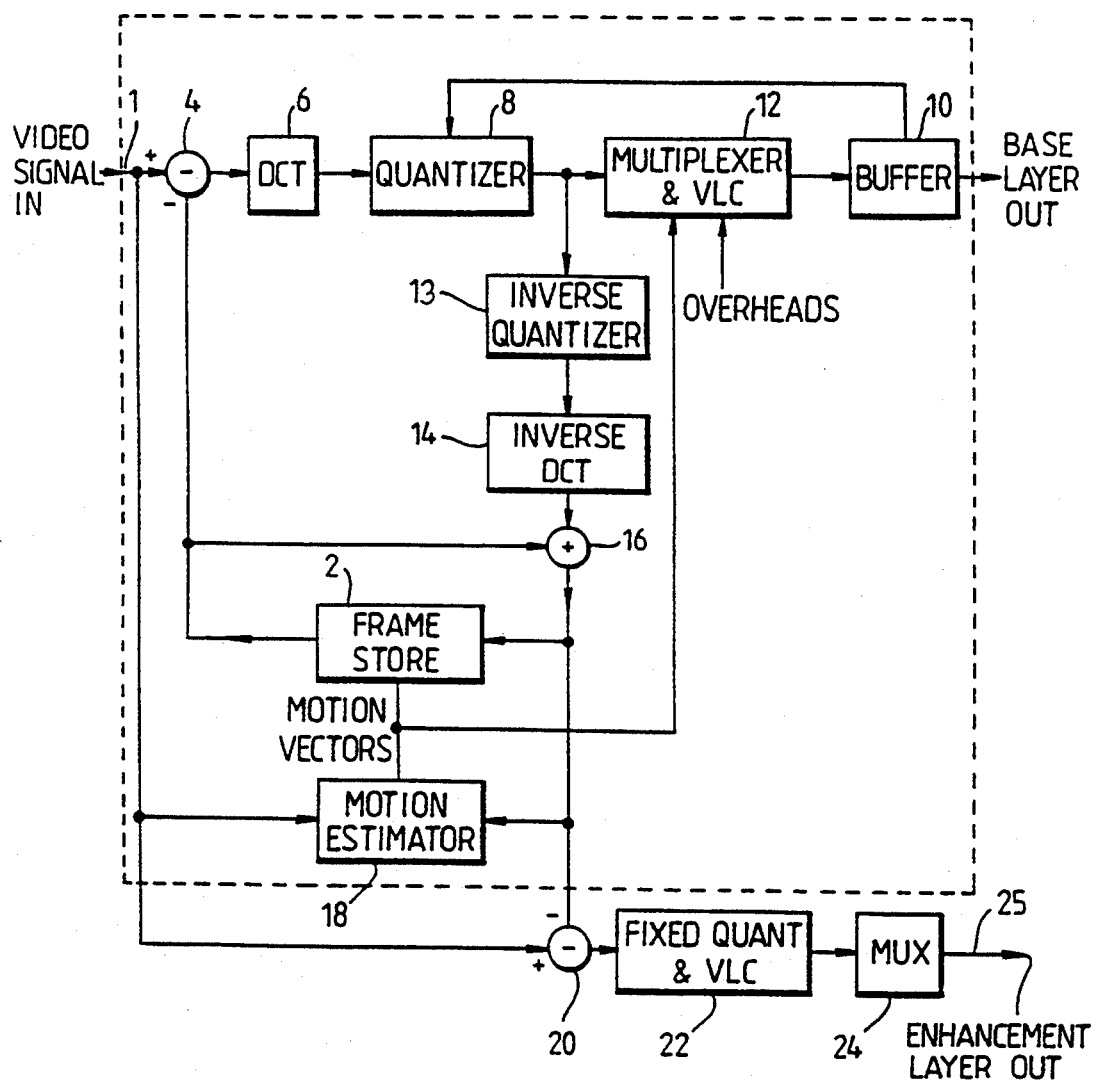
FIG. 1 is a schematic block diagram of a prior art, two-layer video decoder the output of which may be decoded by the method and apparatus of the present invention.

Referring first to FIG. 1, a schematic prior art video signal coder is shown which provides two-layer coding of the type to which the method and apparatus of present invention is applicable and which will now be described generally to aid understanding of the invention. The coder structure of FIG. 1 is a modification to a coder implementing the CCITT H. 261 coding scheme. Those parts corresponding to the H. 261 scheme lie within the broken lines.

FIG. 1 shows the steps of coding a video signal. Separate elements of the diagram do not necessarily represent discrete physical devices carrying out the particular process step.

An incoming (current) video signal, being one of a series, is coupled to an input 1 and has subtracted from it a video signal reconstituted from the immediately previous coded base video signal after compensation for any motion vector data which will be coded along with the code for the current video signal. This reconstituted video signal is obtained from a frame store 2. The subtraction is represented by the subtracter 4.

The resulting difference video signal, which is that to be coded for transmission, is transformed by a DCT 6 and subsequently quantised by a variable quantizer 8. The quantizer 8 is controlled to maintain an output buffer 10 (which stores the quantized data along with other essential information multiplexed with the quantized data by multiplexer and VLC 12) with contents within preset upper and lower limits.

The output from the buffer 10 constitutes the base layer output from which a base video signal can be reconstituted at a decoder in known manner and as will be described with reference to FIG. 2.

The base video signal is also reconstituted within the H. 261 type coder of FIG. 1 by an inverse quantizer 13 and an inverse DCT 14.

The reconstituted base video signal from the inverse DCT 14 for the immediately previous input video signal is compared to the current incoming video signal by a motion estimator 18 which determines the motion vectors for this current video signal. The reconstituted base video signal is also added to the existing contents of frame store 2 as denoted by adder 16.

The motion estimator 18 is also coupled to the multiplexer 12 which incorporates the motion vectors in the base layer for the video signal being coded and to frame store 2 so that the frame store's 2 contents correspond to that obtained by a decoder decoding the base layer.

The differences between the current incoming video signal and the video signal as would be reconstructed from the immediately previous base layer is derived by subtracting the latter from the former as is denoted by subtracter 20 which is shown coupled to the video signal input 1 and the adder 16. The difference signal is then quantized by a fine quantizer 22 and output via multiplexer 24 as an enhancement layer at output 25.

In one implementation of encoder the enhancement layer is obtained in the trans form domain by subtracting the output of the inverse quantizer 12 from the output of DCT 6 and coupling the difference to the fine quantizer and VLC 22.

The base layer is transmitted on a constant bit rate guaranteed channel which ensures a minimum picture quality is obtained by a receiving decoder. The enhancement layer may be transmitted on a variable bit rate VBR channel to improve the received picture quality when received and take advantage of VBR facilities.

Figure 2:
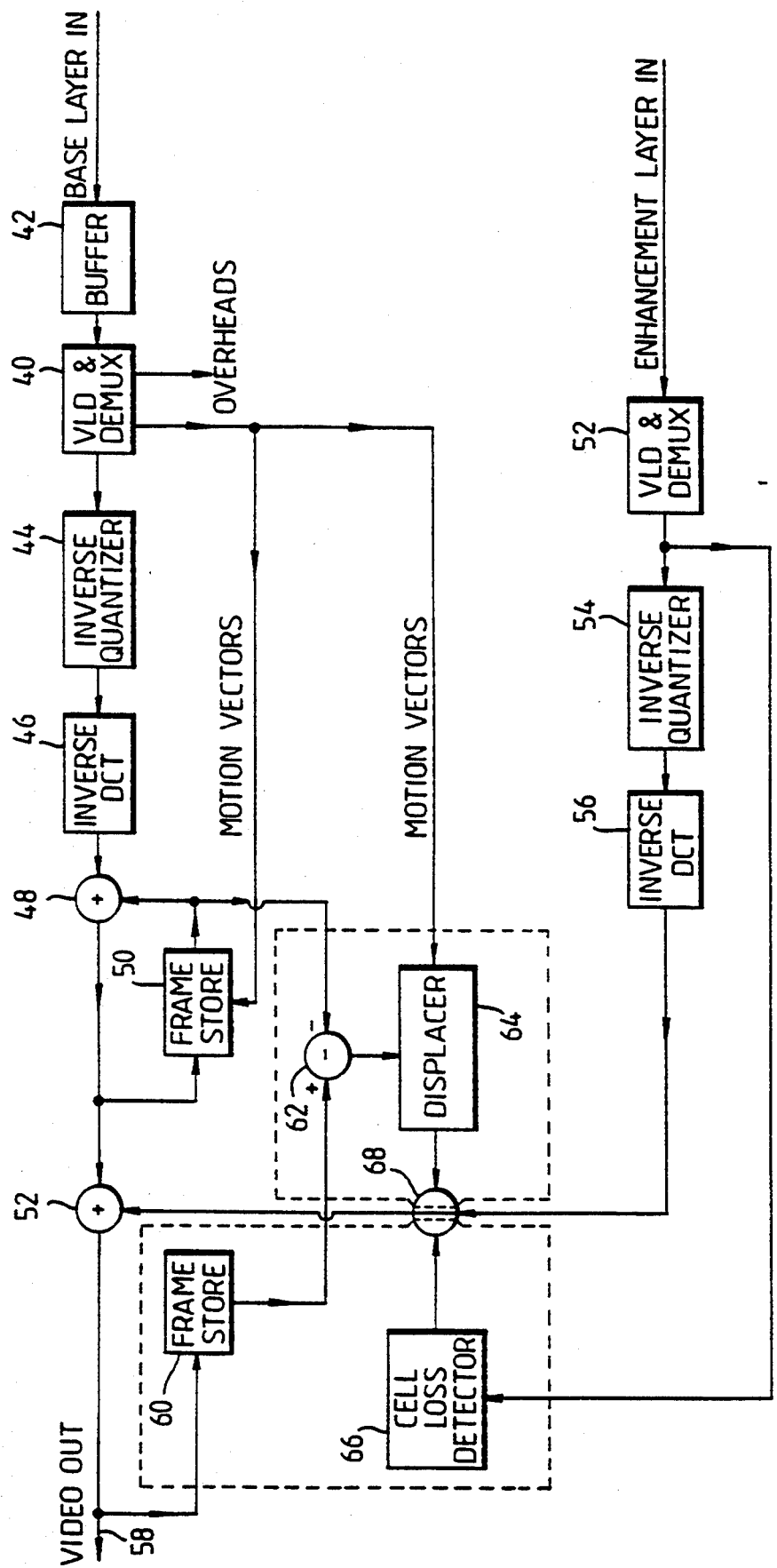
FIG. 2 is a schematic diagram of a decoder according to the present invention.

A known decoder for decoding the two-layer coded video signal provided by the coder of FIG. 1 is shown schematically by part of FIG. 2 which as with FIG. 1, shows the process of decoding individual elements not necessarily corresponding to discrete physical items. The known decoder of FIG. 2 comprises those processes outwith the dotted boxes. These decoding processes will be described first. Those elements inside the dotted box of FIG. 2 comprise additional, exemplary, processes for carrying out the present invention and will be described later.

The decoder of FIG. 2 outwith the dotted boxes operates as follows. A received base layer is coupled to a VLD and demultiplexer 40 via a buffer 42. The output of the demultiplexer 40 is converted to a video signal by inverse quantizer 44 and inverse DCT 46. This decoded base layer signal is used to obtain a base video signal in known manner by adding it to the immediately previous base video signal stored in a frame store 50 (modified as necessary by the motion vectors coupled to the frame store 50 from the demultiplexer 40) as indicated by adder 48.

A received enhancement layer is converted to an enhancement video signal by VLD and demultiplexer 52, inverse quantizer 54, and inverse DCT 56. The output of the inverse DCT 56 is added (i.e. combined), as indicated by adder 52 (constituting combining means), to the base video signal to provide an enhanced video signal at the output 58 of the decoder.

If cells of enhancement data are lost from the enhancement layer because of bit rate limitations imposed by the VBR channel on which the enhancement data is transmitted, then those portions of the final video signal will simply be the base, i.e. unenhanced, video signal.

The decoder of the present invention shown in the entire FIG. 2 can provide some concealment of the lost cells as follows by the use of an interpolating means shows in the dotted boxes of FIG. 2.

The immediately previous video signal output by the decoder of FIG. 2 is stored in a second frame store 60 from which is subtracted, as indicated by a subtracter 62, the base video signal reconstituted from the current base layer. This difference video signal is displaced by a displacer 64 according to the current motion vectors coupled to the displacer 64 from the demultiplexer 40.

The incoming enhancement layer cells are monitored by a cell loss detector 66 (constituting cell loss detection means). If cell loss is detected, enhancement data from the displaced, immediately previous enhancement layer stored in the displacer 64 is switched to the adder 52 by switch 68 under the control of the cell loss detector 66 so that this data interpolates for the enhancement data lost from the current enhancement layer.

The cell loss detector 66 operates by inspecting the cell sequence numbers of the incoming enhancement layer cells. In this embodiment it is part of the VLD and demultiplexer 52 but is shown separate from it for clarity.

Figure 3:
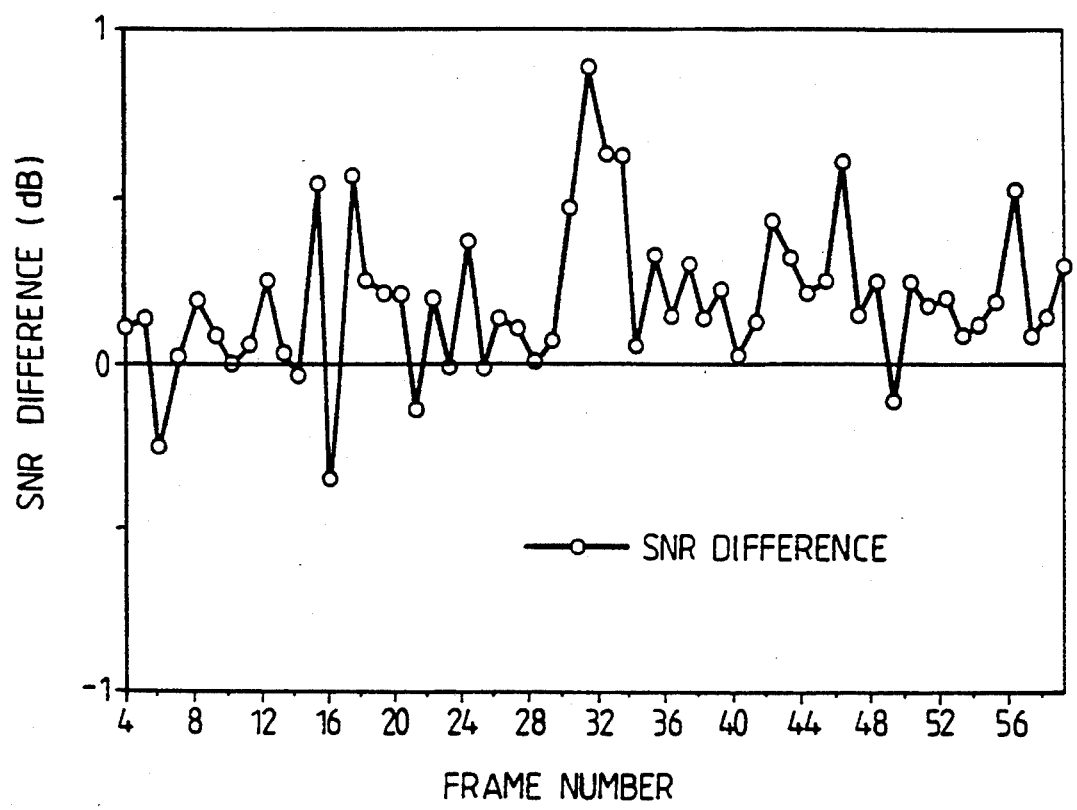
FIG. 3 is a graph of the S/N ratio improvement of a video sequence obtained by the decoder of FIG. 2 compared to the same decoder operated without the use of interpolated data to replace missing enhancement data.

FIG. 3 shows the relative improvement in signal-to-noise ratio (S/N) using the cell concealment method of the present invention. The non-processed picture with a 10 per cent cell loss has an average S/N of 39 dB. The almost constant S/N is due to the variable bit rate coding of the second layer, which codes pictures at a constant quantization step size of 8 (dynamic range of original coefficients $-2048$ to $2047$) in this embodiment of decoder. Finer quantization gives a better picture at the expense of more data in the base layer.

Since the second layer data carry residual quantization noise of the base layer, their contribution to the measured value of S/N seems to be marginal. This is because the base layer S/N itself is relatively high. It has an average of almost 34 dB, which is variable due to the variation in the quantization step sizes. It should also be noted that not all the second layer cells carry large amplitude quantization distortions so their loss does not contribute a large value to S/N. However, their effect on the subjective quality of the pictures is much more pronounced.

Figure 4A:
FIGS. 4a and 4b are copies of photographs showing the quality of the decoded picture of the same standard video sequence used to obtain the results of FIG. 3 suffering 10% cell loss from the enhancement layer without and with, respectively, use of interpolated data.
Figure 4B:

FIGS. 4a and 4b shows a part of picture in a sequence without and with cell concealment, respectively improvements to the tie and the left hand of the portrait obtained by the method and apparatus of the prevent invention can be seen in FIG. 4b. The enhancement on the picture quality becomes more distinct when the processing is applied to an isolated blurred area of the picture.

I claim:

1. A method of decoding a currently received one of a series of two-layer coded video signals, each of which includes a base layer of coded base data and coded motion vector data, and an enhancement layer of coded enhancement data being differences between an uncoded video signal and a reconstruction of the base layer, the method including the steps of:
   a) decoding the base layer to obtain a base video signal;
   b) decoding the enhancement layer to obtain enhancement data; and
   c) combining the base video signal and the enhancement data to obtain a decoded video signal;
   d) detecting whether any enhancement data is missing from the enhancement layer; and, in such a case
   e) interpolating the missing enhancement data from the enhancement data of the immediately previously received coded video signal and the motion vectors of the currently received base layer.

2. A method as in claim 1 in which the enhancement data of the immediately previous received, coded video signal are obtained by determining differences between the immediately previous decoded video signal and a reference base video signal reconstructed from the base layer of the immediately previous received, coded video signal.

3. A method as in claim 2 in which the decoded video signal is stored in a frame store.

4. A method as in claim 1 in which the detection of whether any enhancement data are missing from the enhancement layer is carried out by inspecting the received enhancement layer.

5. A decoder for decoding a currently received one of a series of two-layer coded video signals, each of which includes a base layer of coded base data and coded motion vector data, and an enhancement layer of coded enhancement data being differences between an uncoded video signal and a reconstruction of the immediately previous base video signal, the decoder including:
   a) a first decoding means for decoding the base layer to obtain a base video signal;
   b) a second decoding means for decoding the enhancement layer to obtain enhancement data;
   c) combining means for combining the base video signal and the enhancement data to obtain a decoded video signal;
   d) a cell-loss detection means for detecting whether any enhancement data is missing from the enhancement layer;
   e) interpolating means for providing interpolation data comprising the enhancement data of the immediately previous received, coded video signal modified in accordance with the motion vectors of the currently received base layer; and
   f) means for replacing any missing enhancement data with interpolated data.

6. A decoder as in claim 5 in which the interpolating means includes:
   a first frame store for storing a reference base video signal which is a reconstruction from the base layer of the immediately previous received coded video signal,
   a second frame store for storing a second frame which is the immediately previous decoded video signal,
   differencing means for obtaining the enhancement data by subtracting the reference base video signal from the immediately previous decoded video signal, and
   displacement means for displacing the immediately previous enhancement data in accordance with the received motion vectors.

* * * * *